United States Patent Office 3,336,239
Patented Aug. 15, 1967

3,336,239
ACTIVATED HYDROGENATION CATALYSTS
Donald L. Bailey, Snyder, N.Y., and Colin Eaborn, Oadby, England, assignors to Union Carbide Corporation, a corporation of New York
No Drawing. Filed Sept. 25, 1962, Ser. No. 226,175
11 Claims. (Cl. 252—430)

The present invention relates to activated hydrogenation catalysts and to hydrogenation and/or reduction reactions which are effected in the presence of said catalysts.

The present invention is based on the discovery that various metal compounds can be made extremely active for use as hydrogenation and/or reduction catalysts by reacting said metal compounds with a Si—H bonded compound. For sake of brevity and clarity, the term "activated catalyst(s)," as used herein, refers to the catalytic product which results from the reaction of the metal compound with the Si—H bonded compound. Hydrogenation and/or reduction reactions when effected in the presence of these novel activated catalysts proceed at reaction rates which are up to 40 times faster, and more, as compared to an equal quantity of the same metal compound which has been activated in accordance with prior art methods. This order of magnitude regarding the hydrogenation and/or reduction reaction rates is, indeed, surprising and unexpected.

The metal compounds which are contemplated in the preparation of the novel activated catalysts of the invention contain the metal component in one of its oxidation states, said metal including those which have an atomic number of 44–46 and 76–78, i.e., ruthenium, rhodium, palladium, osmium, iridium, and platinum. By way of illustrations, the metal component can be in the form of $Pd^{+2}$, $Pt^{+2,+4}$, $Rh^{+1,+2,+3}$, $Ir^{+1,+2}$, $Ru^{+1,+2,+3}$, $Os^{+1,+2,+3}$, and the like.

Illustrative metal compounds which can be employed to prepare the activated catalysts include, for instance, the haloplatinic acids, e.g., bromoplatinic acid, chloroplatinic acid, and the like; the alkali metal haloplatinates, e.g., sodium chloroplatinate, potassium chloroplatinate, sodium bromoplatinate, potassium bromoplatinate, and the like; the alkali metal halopalladates, e.g., potassium chloropalladate, sodium chloropalladate, and the like; the alkali metal haloplatinites, e.g., sodium chloroplatinite, potassium chloroplatinite, and the like; magnesium halopalladate such as magnesium chloropallate; magnesium haloplatinate such as magnesium chloroplatinate; the trialkylplatinum halides, e.g., trimethylplatinum iodide, trimethylplatinum chloride, and the like; the palladous alkanoates, e.g., palladous acetate, palladous formate, palladous propionate, and the like; the metal oxides and metal halides, e.g., palladous dichloride, palladous oxide, osmium monoxide, platinous dichloride, platinous monoxide, and the like; coordination complexes of palladium or platinum with ligands, one or more of which can be or have been displaced by an alkene, e.g., ethylene, propylene, butylene, etc., to form a palladium-olefin complex or a platinum-olefin complex, e.g., palladous acetylacetonate, palladous dibenzonitrile dichloride, ethylene platinous chloride, and the like; bis(cyclopentadienyl)osmium; cyclopentadienyl iridium cyclopentadiene; bis(cyclopentadienyl)-ruthenium; cyclopentadienyl rhodium cyclopentadiene; and the like.

The Si—H bonded compounds which are employed to prepare the novel activated catalysts are characterized by the presence of at least one hydrogen atom bonded to a silicon atom of the molecule. Thus, the starting silicon materials include a wide range of compounds which can be entirely inorganic in nature or which can contain organic substituents. Furthermore, these starting silicon compounds can constitute a monomer, a polymer, a copolymer, or any mixture thereof. Thus, for example, we can employ silane ($SiH_4$), and/or any of the mono-, di-, and trihalo-substituted silanes, and/or any of the mono-, di-, and tri-organo substituted silanes, as well as silanes having both halo- and organo-substituents. Typical of these monomeric silanes are those compounds which can be represented as follows: $HSiCl_3$, $R_3SiH$, $H_2SiCl_2$, $HRSiCl_2$, $HR_2SiCl$, $HSi(OR')_3$, $HRSi(OR')_2$, $$HRSi(OR')(OOCR')$$

$HR_2Si(OOCR')$, and the like. Also suitable for use are the comparable amino silanes such as $HRSi(NR_2')_2$.

Those polymeric silicon compounds which are useful in activating the aforementioned metal compounds in accordance with the invention include, by way of illustrations, homopolymers of siloxanes, silanes, silcarbanes, silizanes, etc., as well as copolymers thereof. The polysiloxanes are prepared by hydrolysis and condensation processes which employ one or more hydrolyzable silanes (such as those described above) as the starting material. Polysilanes can be obtained as a product of the reaction between methyl chloride and silicon, preferably in the presence of a copper catalyst, while the polysilizanes can be prepared by the reaction of various chlorsilanes with ammonia. Polysilylcarbanes are prepared by Wurtz or Grignard reactions as well as by addition reactions. Many of these polymeric materials can be graphically depicted as follows: $R_2HSiSiHR_2$, $ClRHSiSiHRCl$, $R_2HSiR''SiR_3$, $RCl_2SiR''SiR_2H$, $(RHSiO)_x$ wherein $x$ is an integer having a value of at least 3; and the like; as well as polymers of the units $HSiO_{1.5}$, $R_2HSiO_{0.5}$, $H_2SiO$, $RH_2SiO_{0.5}$, etc.; and copolymers containing one or more of the units $R_3SiO_{0.5}$, $R_2SiO$, $RSiO_{1.5}$, $SiO_2$, etc., with at least one or more of the units $HSiO_{1.5}$, $R_2HSiO_{0.5}$, $RHSiO$, $H_2SiO$, $RH_2SiO_{0.5}$, and the like.

With respect to the formulae which illustrate the various monomeric and polymeric silicon compounds that can be employed to prepare the novel activated catalysts, the variables R and R' can represent any organic radical and each can represent the same or different radical in a given structure. Preferably, each R and R', individually, represents a divalent hydrocarbon radical which is free of aliphatic unsaturation, i.e., olefinic and acetylenic unsaturation, such as the alkyls, e.g., methyl, ethyl, isopropyl, n-butyl, amyl, 2-ethylhexyl, decyl, octadecyl, and the like; the cycloalkyls, e.g., cyclopentyl, cyclohexyl, alkylcyclohexyl, cycloheptyl, and the like; the aryls, e.g., phenyl, napthyl, and the like; the aralkyls, benzyl, phenethyl, phenylpropyl, and the like; the alkaryls, e.g., tolyl, xylyl, propylphenyl, and the like. The variable R'' can represent a divalent organic radical, preferably a divalent hydrocarbon radical which is free of aliphatic unsaturation, such as the alkylenes, e.g., ethylene, propylene, butylene, hexamethylene, and the like; the alkylidenes, e.g., methylene, ethylidene, propylidene, butylidene, hexylidene, and the like; the cycloalkylenes, e.g., cyclopentylene, cyclohexylene, and the like; the arylenes, phenylene, naphthylene, and the like.

The most preferred silicon compounds are those materials which are free of silicon bonded halogen. While silicon compounds which contain silicon bonded halogen can be employed, it has been observed that more rigorous conditions are required to produce the activated catalyst than those Si—H compounds which lack halogen therein. Illustrative of the preferred silicon compounds are, for instance, the dialkoxysilanes and the trialkoxysilanes, e.g., triethoxysilane, tri-n-propoxysilane, methyl hydrogen diethoxysilane, and the like; and the Si—H containing polymers which can be generically depicted as containing at least one unit of the formula:

$$R_aH_bSiO_{4-a-b/2}$$

wherein R is as defined above, wherein $b$ is a number which has a value of at least one, and wherein $a$ is a number which has a value of from 0 to 2; and from zero up to many units represented by the formula:

$$R_cSi_{4-c/2}$$

wherein R is as defined above, and wherein $c$ is an integer which has a value of from 0 to 3. Obvious such polymers can contain residual silicon-bonded alkoxy or other hydrolyzable groups inasmuch as they are generally prepared by hydrolysis and condensation reactions of hydrolyzable silanes.

The preparation of the novel activated catalysts is preferably conducted in the presence of an inert, normally-liquid organic vehicle in which the metal compound and/or Si—H bonded compound are soluble or dispersible therein. Illustrative vehicles include, for example, the aromatic hydrocarbons and the halogenated aromatic hydrocarbons, e.g., benzene, toluene, xylene, ethylbenzene, chlorobenzene, and the like; various oxygenated organic compounds such as the dialkyl ethers of alkylene glycol, e.g., the dimethyl- and diethyl ethers of ethylene glycol, of propylene glycol, of diethylene glycol, and the like; normally-liquid saturated hydrocarbons including open chain, cyclic, and alkyl substituted cyclic saturated hydrocarbons such as hexane, heptane, octane, cyclohexane, the alkylcyclohexanes, decahydronaphthalene, various normally-liquid petroleum hydrocarbon fractions and the like; the alkanols, e.g., ethanol, propanol, n-butanol, t-butanol, and the like; the dialkyl ethers, e.g., methyl ether, ethyl ether, propyl ether, methyl ethyl ether, methyl butyl ether, and the like; the alkylene glycols and polyalkylene glycols, e.g., ethylene glycol, propylene glycol, diethylene glycol, and the like. If desired, a mixture of mutually miscible inert normally-liquid organic vehicles can be employed.

Although many types of procedures can be used successfully to obtain the novel activated catalyst of the invention, it is generally found preferable to prepare the activated catalyst in the absence of the unsaturated compounds. For example, an admixture of the metal compound, e.g., chloroplatinic acid, and the Si—H bonded compound, preferably maintained under the influence of heat and in a suitable reaction medium, e.g., in inert, normally-liquid organic vehicle, yields the active form of the catalyst. The resulting activated catalytic mixture then can be used directly in the hydrogenation and/or reduction of the candidate reactant, or alternatively, the activated platinum catalyst can be filtered from the resulting reaction mixture thereby giving a highly active form of platinum black. Though a wide temperature range can be employed in preparing the activated catalysts, it has been found desirable to effect the activation at a temperature in the range of from about 20° C. to below that temperature at which decomposition of the reactants occurs. Highly desirable reaction rates are manifest by conducting the reaction from about 25° C. to about 110° C., and preferably from about 30° C. to about 80° C. The preparation of the activated catalysts can be effected over a period of time ranging from several minutes to several hours, e.g., from 5 minutes, and lower, to 3 hours, and higher. For optimum results, the reaction period is at least sufficient to reduce a portion of the metal component of the metal compound from its present oxidation state to a lower oxidation state. For instance, using chloroplatinic acid the platinum is reduced from Pt(IV) to, for example, Pt(0). It has been found desirable, also, not to unduly prolong the reaction period since in the reduction of the metal component of the metal compound reactant, said metal component (in its zero valence state) tends to agglomerate thereby diminishing the surface area available for catalysis in the hydrogenation and/or reductions reactions.

If desired, finely divided catalyst supports such as carbon black or gamma-alumina can be added to the reaction medium during the preparation of the activated catalysts in which case the metal, e.g., platinum, palladium, etc., is deposited on the surface of the catalyst support. In many instances, it will be found convenient to carry out the activation of the catalyst during the hydrogenation and/or reduction of the unsaturated compound. Quite satisfactory results can be obtained by mixing the metal compound and the Si—H bonded compound with the candidate reactant to be hydrogenated and/or reduced, and then effecting the hydrogenation and/or reduction reaction in the conventional manner. By way of example, a mixture of pentene-1, triethoxysilane, and a catalytic amount of chloroplatinic acid, in ethanol, gives substantial conversion of pentene-1 to pentane when brought into contact with several atmospheres of hydrogen at room temperature.

It is readily appreciated that various factors will govern, to a significant extent, the achievement of optimum activity of the activated catalyst such as, for example, the metal compound and Si—H bonded compound of choice, the operative conditions, the use of an inert, normally-liquid organic vehicle, the concentration of the reactants, and so forth. However, it has been observed that an extremely enhanced catalytic material is obtained when an excess of Si—H bonded compound over that required to reduce the metal component (of the metal compound) to the free metal state is employed. In different language, it is preferred to use an amount of silanic hydrogen atoms, i.e., hydrogen atoms monovalently bonded to the silicon (Si) atom, contained by the Si—H bonded compound which is in excess of that required to reduce the metal component (of the metal compound) from its present oxidation state to the zero oxidation (or valence) state. The metals which are contemplated include rhodium, ruthenium, platinum, palladium, osmium, and iridium. Thus, four silanic hydrogen atoms are necessary to reduce, for example, Pt(IV) in a given molecule to Pt(0). It is readily apparent, therefore, that the concentration of Si—H bonded compound to metal compound can be conveniently expressed as equivalents of silanic hydrogen atoms (contained by the Si—H bonded compound) per mol of metal compound. As an illustration, chloroplatinic acid contains the metal component as Pt(IV); thus, it is preferred to use an amount of Si—H bonded compound which results in a ratio of at least four equivalents of silanic hydrogen atoms per mol of chloroplatinic acid. In a broad aspect, the ratio of equivalents of silanic hydrogen atoms (contained in the Si—H bonded compound) to mols of metal compound is at least about 1:20, and lower, and generally at least about 1:10. However, at the aforesaid lower ratios, the maximum activation is not obtained. An extremely large excess of the Si—H compound is disadvantageous from an economic standpoint since the unreacted Si—H bonded compound readily reacts with the unsaturated compound during the hydrogenation and/or reduction reactions. Satisfactory activation can be obtained when the ratio of equivalents of silanic hydrogen atoms to mols of metal compound is in the range of from about 1:4 to about 50:1 whereas highly desirable activation can be effected when the range is from about 1:2 to about 30:1.

As alluded to previously, one embodiment of the invention is directed to novel hydrogenation and/or reduction processes which are effected in the presence of the novel activated catalysts. The organic compounds which can be employed as reactants in these novel processes are those which contain carbon to carbon unsaturation such as olefinic unsaturation, i.e., $>C=C<$, and/or acetylenic unsaturation, i.e., $-C\equiv C-$, and/or functional groups such as aldehydo

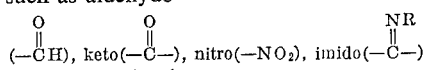

nitrilo (—CN), and others.

These organic compounds include, for instance, the hydrocarbons, halogenated hydrocarbons, alcohols, phenols, ethers, ketones, aldehydes, acetals, acids, esters, amides, imides, nitriles, and others.

Illustrative unsaturated hydrocarbons include, ethylene, acetylene, vinylacetylene, 2-butyne, propene, butenes, pentenes, hexenes, heptenes, octenes, decenes, dodecenes, octadecenes, butadiene, isoprene, pentadienes, hexadienes, heptadienes, octadienes, decadienes, dodecadienes, octadecadienes, styrene, divinylbenzenes, dihydronaphthalenes, indene, stilbene, 1-phenyl-1-propene, 1,1-diphenylene, cyclopentenes, cyclohexenes, cyclopentadiene, dicyclopentadiene, vinylcyclohexenes, alkyl-substituted cycloalkenes, alkyl-substituted cycloalkadienes, aryl-substituted alkadienes, aryl-substituted cyclopentenes, unsaturated macromolecules such as butadiene polymer and copolymers, and the like.

Examples of unsaturated alcohols and phenols are exemplified by compounds such as 3-cyclohexenylmethanol, p-allylphenol, p-crotylphenol, dicrotylphenols, p-(2-cyclopentenyl)phenol, 3-penten-1-ol, 5-decen-1-ol, 9-octadecen-1-ol, 2-ethyl-2-hexenol, 3-cyclopentenol, 4-cyclohexenol, alkyl-substituted alkenols, aryl-substituted alkenols, cycloalkenols, cycloalkadienols, alkyl-substituted cycloalkenols, cycloalkenyl-substituted alkanols, alkenylphenols, and the like.

Exemplary unsaturated ethers which are contemplated include, among others, diallyl ether of diphenylolmethane; diallyl ether of 2,2-diphenylolpropane; diallyl ether; butyl crotyl ether; 2-pentenyl butyl ether; 4-pentenyl butyl ether; 4-octenyl 3-pentenyl ether; ortho-allylphenyl ethyl ether; butyl 3-dodecenyl ether; 2,4-diallylphenyl ethyl ether; 3-cyclohexenylmethyl alkyl ethers; 3-cyclohexenylmethyl aryl ethers; 4-decenyl 2-propenyl ether; 1,4-pentadienyl alkyl ether; 1,4-alkadienyl alkenyl ether; and the like.

Illustrative nitrogen-containing compounds, e.g., amides, imides, nitriles, and the like, amenable as starting material include, for example, acrylonitrile, propionitrile, pentanenitrile, decanenitrile, 3-pentenenitrile, 4-pentenenitrile, 4-cyanocyclohexene, ortho-, meta-, and para-vinylbenzonitrile, 3-pentenamide, 4-pentenamide, oleamide, ortho-, meta-, and para-vinylbenzamide, 3-cyclohexene-1-carboxamide, N-crotylmaleimide, N-allylphthalimide, and the like.

Among the carbonylic compounds, e.g., aldehydes, ketones, acids, esters, and the like, which can be employed in the novel processes include, for example, acrolein, crotonaldehyde, 3-hexenal, 3-decenal, acetaldehyde, propionaldehyde, butyraldehyde, hexanal, phenylacetaldehyde, succinaldehyde, glyceraldehyde, adipaldehyde, 2-hydroxyadipaldehyde, vinylacetic acid, oleic acid, cinnamic acid, soybean oil, linseed oil, linoleic acid, mesityl oxide, allyl acetate, allyl methacrylate, crotyl acrylate, α-phenyl-β-pentenyl α-benzylcrotonate, β-pentenyl α-ethyl-β-propyl-acrylate, octyl β, δ-pentadienoate, crotyl α-cyclohexylcrotonate, 2-ethylhexyl oleate, 2-cyclopentenyl crotonate, glycol dioleate, vinyl α-ethyl-β-propyl-β-butylacrylate, 4-decenoic acid, acetone, methyl ethyl ketone, butyrone, methyl allyl ketone, methyl 2-pentenyl ketone, diallyl maleate, vinyl α-tolyl-β-ethyl-acrylate, 2-ethylhexyl α-methyl β-ethylacrylate, propyll-cyclohexenecarboxylate, butyl α, γ-diethyl-α, γ-pentadienoate, methyl α-phenyl-α, γ-hexadienoate, tolyl β-phenethyl-γ-butyl-α, γ-heptadienoate, phenyl 1-cyclopentenecarboxylate, tolyl 2-methyl-1-cycloheptenecarboxylate, 2-ethylhexyl 6-methyl-3-cyclohexenecarboxylate, butyl 2-phenyl-1-cyclohexenecarboxylate, allyl 2-benzyl-2,3-epoxyhexanoate, 3-cyclohexenylmethyl acetate, 3-cyclohexenylmethyl acrylate, 3-cyclohexenylmethyl acylates, ethylene glycol bis(2-butenoate), propylene glycol bis(acrylate), 1,5-pentanediol bis (2-butenoate), 1,3-butylene glycol crotonate, 2,3-epoxybutyrate, ethylene glycol methacrylate, 2-methyl-2,3-epoxypropionate; aryl, alkenyl, cycloalkyl, cycloalkenyl, alkaryl, alkyl, and aralkyl alkenoates; aryl, alkenyl, cycloalkyl, alkyl, cycloalkenyl, alkaryl, and aralkyl alkadienoates; aryl, alkyl, alkenyl, cycloalkyl, cycloalkeny, alkaryl, and aralkyl cycloolefin-1-carboxylates; alkylene glycol bis(2-alkenoates); alkylene glycol 2-alkenoate 2,3-epoxyalkanoates; and the like.

Illustrative mono-unsaturated acetals include, for example, 1,2,5,6-tetrahydrobenzaldehyde diethyl acetal, para-vinylbenzaldehyde dibutyl acetal; the dialkyl acetals of alkenals, such as the dimethyl, diethyl, dipropyl, diisopropyl, dibutyl, dihexyl, di-2-ethylhexyl, didecyl, etc., acetals of unsaturated aliphatic aldehydes, for example, 2-, 3-, 4-, etc., alkenals, and the like.

Illustrative unsaturated halogenated hydrocarbons which can be employed include allyl chloride, crotyl chloride, 1,4-dichloro-2-butene, 3,4-dichloro-1-butene, 3-chloro-1-butene, 2-chloro-3-pentene, 2-ethyl-2-hexenyl chloride, methallyl chloride, crotyl fluoride, crotyl bromide, ortho-, meta-, and para-chlorostyrene, ortho-, meta-, and para-chloromethylstyrene, 1-chloro-3-vinylcyclohexane, 4-(trichloromethyl)-1-cyclohexene, tetra-(chloromethyl) ethylene, 1-chloro-4-fluoro-2-butene, parabromobenzylethylene and the like.

Illustrative nitroparaffins and nitroaromatics include nitromethane, 1-nitropropane, 1-nitrobutane, nitrobenzene, m-nitrobenzaldehyde, o-nitroanisole, p-nitroethylbenzene, p-nitrocinnamic acid, 2,4-dinitroaniline, m-dinitrobenzene, 1,5-dinitronaphthalene, 2,4-dinitrophenol, and the like.

It is readily manifest from the preceding illustrative list of organic compounds that not only can the carbon to carbon aliphatic unsaturation be hydrogenated, or that various functional groups, e.g., aldehydo, keto, nitro, etc., be reduced, but also, both the aliphatic unsaturation and the functional groups can be simultaneously hydrogenated. Moreover, the hydrogenation, in various instances, can be selective, that is to say, the aliphatic unsaturation can be hydrogenated while the functional group(s) remain intact or vice versa.

The activated catalysts are employed in catalytically significant quantities in the hydrogenation and/or reduction reactions. It is highly desirable to effect these reactions in the essential absence of impurities, e.g., sulfur and sulfur-containing compounds, which tend to inactivate the catalysts. Thus, when highly pure reactants are employed, the concentration can be as low as $1 \times 10^{-8}$ mol, and lower, of activated catalyst (calculated as the metal compound) per equivalent of candidate reactant. The phrase "equivalent of candidate reactant" can be considered to be one mol of the candidate reactant multiplied by the reciprocal of the number of hydrogen molecules ($H_2$) which is required to hydrogenate and/or reduce one molecule of said candidate reactant. Thus, for example, one mol of butene-2 contains one equivalent; one mole of butadiene-1,3 contains two equivalents; one mol of propyne contains two equivalents; one mol of 2-hydroxyadipaldehyde contains two equivalents; and one mol of acrolein contains two equivalents. However, with nitrobenzene, for example, it would theoretically take three moles of hydrogen to reduce one mol of nitrobenzene to give one mol of aniline since two mols of water are formed. Thus, nitrobenzene contains three equivalents. It is preferred, however, to employ from about $1 \times 10^{-3}$ to $1 \times 10^{-7}$ mols of activated catalyst (calculated as the metal compound) per equivalent of candidate reactant. Higher catalyst concentrations can be used with effective results but such concentrations suffer obvious economic disadvantages. For optimum results, of course, the particular catalyst employed, the nature of the candidate reactant, the operative conditions under which the hydrogenation and/or reduction reaction is conducted, and other factors will largely determine the desired catalyst concentration. It is highly desirable that the catalyst be soluble in or dispersible in the reaction medium.

The hydrogenation and/or reduction reaction can be conducted over a wide temperature range and pressure range. The selection of the operative pressure and operative temperature for optimum results will depend upon various factors such as the nature of the candidate reactant, the nature and concentration of the catalyst, the use of an inert normally-liquid organic vehicle, the equipment employed, and the like. Broadly, the reaction temperature can be as low as 0° C., and lower, and as high as 300° C., and higher. A suitable temperature range is from about 20° C. to about 200° C. The operative pressure, also, can be varied over a wide range, e.g., from slightly below atmospheric pressure to super-atmospheric pressures. It is preferred, however, that the total pressure slightly less than one atmosphere and as high as 300 atmospheres, and higher. A total pressure up to about 100 atmospheres is highly preferred. For obvious reasons, it is desirable to employ an amount of hydrogen which is in excess of that required to effect the desired hydrogenation and/or reduction of the candidate reactant. The concentration of hydrogen to be employed for optimum results is readily ascertainable to those skilled in the art.

The hydrogenation reaction is most suitably effected as an essentially liquid phase reaction. The homogeneous liquid phase reaction is extremely preferred. Also preferred, however, is a catalytic dispersion in the liquid reaction medium. To this extent, sufficient pressure is employed to maintain an essentially liquid reaction medium regardless whether or not an inert, normally-liquid organic vehicle is employed.

In general, the reaction time will vary depending on the operative temperature, the nature of the candidate reactant employed, the particular catalyst and the concentration employed, and other factors. In view of the illustrative variables noted above, the reaction is conducted for a period of time sufficient to hydrogenate the candidate reactant. It has been observed that desirable results can be obtained by conducting the reaction for a period of time ranging from several minutes to several hours, or longer. In general, a reaction time of from about 0.5 hour, and lower, to about 24 hours, and higher, is suitable.

The process of the invention can be executed in a batch, semi-continuous, or continuous fashion. The reaction vessel can be a metal vessel, steel autoclave, elongated metallic tube, or other equipment and material employed in the hydrogenation art provided that the catalyst-containing compound is not sensitive to this material of construction. The order of addition of catalyst and candidate reactant does not appear to be critical. A suitable procedure is to add the catalyst to the reaction zone containing the candidate reactant. If desired, the catalyst can be in solution or suspension (e.g., in an inert normally-liquid organic vehicle). Incremental addition of catalyst to the reaction zone can be employed. If desired, the above procedure can be reversed, that is, the candidate reactant can be added to the reaction zone containing the catalyst (or a catalyst solution or suspension).

Unreacted reactant and hydrogenated product can be recovered from the resulting reaction product mixture by conventional techniques such as by distilling said reaction product under reduced pressure.

The following examples are illustrative:

*Example 1*

(A) A solution of tribenzylsilane in ethanol was prepared by dissolving 0.03 gram (0.1 mmole) of tribenzylsilane in 20 milliliters of 95 percent ethanol. This solution was heated to about 70° C. followed by the addition thereto of one milliliter of chloroplatinic acid (0.01 mmole) contained in a 95 percent ethanol solution. The resulting solution, upon cooling to room temperature, i.e., about 22° C., quickly darkened and eventually became dark brown. The reaction was assumed to be complete after about 10 minutes. Thereafter, the resulting reaction product mixture together with 20 milliliters of 95 percent ethanol (as washings) was transferred to a 250 milliliter reaction flask.

(B) An amount of octene-1 (40 mmoles) in 95 percent ethanol then was added to said reaction flask and sufficient 95 percent ethanol was added thereto to give 50 milliliters of solution. Thereafter, the reaction flask was immersed in a constant temperature bath maintained at 30° C., said flask being attached to a gas burette containing hydrogen (kept at one atmosphere). The system was flushed three times with hydrogen, and the reaction mixture was shaken at 300 cycles per minute. The rate of hydrogen gas was recorded during the operation. The rate of hydrogen gas absorption was 77.5 milliliters per minute. The resulting product was octane.

(C) With reference to section A supra concerning the preparation of the activated catalyst, it was noted that prolonged heating of the dark brown reaction mixture caused platinum black to precipitate. However, this mixture containing platinum black, though somewhat less active than the dark brown mixture, effectively hydrogenated octene-1.

*Examples 2–14*

The catalyst preparation described in Example 1 supra was followed to prepare 13 activated catalyst solutions using chloroplatinic acid and tribenzylsilane as the reactants. These activated catalyst solutions then were employed to catalyze the hydrogenation of octene-1 in the same manner as set forth in Example 1. The pertinent data are shown in Table I infra.

TABLE I

| Example No. | Tribenzylsilane, mmole | Chloroplatinic Acid mmole | Ratio [1] | Rate of $H^2$ Absorption, milliliters/ minute |
|---|---|---|---|---|
| 2 | 0.0025 | 0.01 | 0.25 | 24.6 |
| 3 | 0.005 | 0.01 | 0.5 | 36.2 |
| 4 | 0.010 | 0.01 | 1.0 | 51.0 |
| 5 | 0.025 | 0.01 | 2.5 | 67.5 |
| 6 | 0.04 | 0.01 | 4.0 | 72.0 |
| 7 | 0.06 | 0.01 | 6.0 | 75.0 |
| 8 | 0.10 | 0.01 | 10.0 | 77.5 |
| 9 | 1.00 | 0.01 | 100 | 83.6 |
| 10 | 0.01 | 0.10 | 0.1 | 26.5 |
| 11 | 0.05 | 0.10 | 0.5 | 106.0 |
| 12 | 0.10 | 0.10 | 1 | 135.7 |
| 13 | 0.20 | 0.10 | 2 | 160.5 |
| 14 | 1.00 | 0.10 | 10 | 191.0 |

[1] Ratio of equivalents of silanic hydrogen atoms contained in tribenzylsilane per mol of chloroplatinic acid.

*Example 15*

(A) Following the procedure described in Example 1 supra, the reaction of 0.002 mmole of chloroplatinic acid with 1.0 mmole of tribenzylsilane gave an activated catalytic mixture which effectively catalyzed the hydrogenation of octene-1 to octane. The rate of hydrogen gas absorption during the hydrogenation reaction was 23.2 milliliters per minute.

(B) In an analogous manner as above, when 0.01 mmole of potassium chloropalladate (in lieu of 0.002 mmole of chloroplatinic acid) is reacted with 1.0 mmole of tribenzylsilane, the resulting catalytic mixture effectively hydrogenated hexene-1 to hexane.

*Example 16*

(A) Following the procedure described in Example 1 supra, the reaction of 0.02 mmole of chloroplatinic acid with 1.0 mmole of tribenzylsilane gave an activated catalytic mixture which effectively catalyzed the hydrogenation of octene-1 to octane. The rate of hydrogen gas absorption during the hydrogenation reaction was 121.0 milliliters per minute. This example is to be compared with Example 15A supra, since a tenfold increase of chloroplatinic acid prior to reaction with tribenzylsilane resulted in a catalytic mixture which increased the hydrogen gas absorption rate during the hydrogenation of octene-1 from 23.2 to 121.0 milliliters per minute.

(B) In an analogous manner as above, when 0.01 mmole of bromoplatinic acid (in lieu of 0.2 mmole of chloroplatinic acid) is reacted with 1.0 mmole of tribenzylsilane, the resulting catalytic mixture effectively hydrogenated acetaldehyde to ethanol.

*Example 17*

(A) Following the procedure described in Example 1 supra, the reaction of 0.01 mmole of chloroplatinic acid with 1.0 mmole of tribenzylsilane gave an activated catalytic mixture which effectively catalyzed the hydrogenation of octene-1 to octane. The rate of hydrogen gas absorption during the hydrogenation reaction was 83.6 milliliters per minute.

(B) In an analogous manner as above, when 0.03 mmole of trimethylplatinum chloride (in lieu of 0.01 mmole of chloroplatinic acid) is reacted with 1.0 mmole of tribenzylsilane, the resulting catalytic mixture effectively hydrogenated allyl chloride to propyl chloride.

*Example 18*

(A) Following the procedure described in Example 1 supra, the reaction of 0.10 mmole of chloroplatinic acid with 1.0 mmole of tribenzylsilane gave an activated catalytic mixture which effectively catalyzed the hydrogenation of octene-1 to octane. The rate of hydrogen gas absorption during the hydrogenation reaction was 191.0 milliliters per minute. This example is to be compared with Example 17A supra, since a tenfold increase of chloroplatinic acid prior to reaction with tribenzylsilane resulted in a catalytic mixture which increased the hydrogen gas absorption rate during the hydrogenation of octene-1 from 83.6 to 191.0 milliliters per minute.

(B) In an analogous manner as above, when 0.10 mmole of palladous acetate (in lieu of 0.10 mmole of chloroplatinic acid) is reacted with 1.0 mmole of tribenzylsilane, the resulting catalytic mixture effectively hydrogenated methyl vinyl ether to methyl ethyl ether.

*Example 19*

(A) Following the procedure described in Example 1 supra, the reaction of 0.10 mmole of chloroplatinic acid with 0.10 mmole of trichlorosilane gave an activated catalytic mixture which effectively catalyzed the hydrogenation of octene-1 to octane. The rate of hydrogen gas absorption during the hydrogenation reaction was 96.0 milliliters per minute.

(B) In an analogous manner as above, when 0.05 mmole of platinous dichloride (in lieu of 0.10 mmole of chloroplatinic acid) is reacted with 1.0 mmole of trichlorosilane, the resulting catalytic mixture effectively hydrogenated nitrobenzene to aniline.

*Example 20*

(A) Following the procedure described in Example 1 supra, the reaction of 0.10 mmole of chloroplatinic acid with 1.0 mmole of trichlorosilane gave an activated catalytic mixture which effectively catalyzed the hydrogenation of octene-1 to octane. The rate of hydrogen gas absorption during the hydrogenation reaction was 161.0 milliliters per minute. This example is to be compared with Example 19A supra, since a tenfold increase of trichlorosilane prior to reaction with chloroplatinic acid resulted in a catalytic mixture which increased the hydrogen gas absorption rate during the hydrogenation of octene-1 from 96.0 to 161.0 milliliters per minute.

(B) In an analogous manner as above, when 0.10 mmole of palladous acetylacetonate (in lieu of 0.10 mmole of chloroplatinic acid) is reacted with 1.0 mmole of trichlorosilane, the resulting catalytic mixture effectively hydrogenated acrolein to n-propyl alcohol.

*Example 21*

(A) Following the procedure described in Example 1 supra, the reaction of 0.10 mmole of chloroplatinic acid with 0.10 mmole of triphenylsilane gave an activated catalytic mixture which effectively catalyzed the hydrogenation of octene-1 to octane. The rate of hydrogen gas absorption during the hydrogenation reaction was 92.0 milliliters per minute.

(B) In an analogous manner as above, when 0.10 mmole of bis(cyclopentadienyl)osmium (in lieu of 0.10 mmole of chloroplatinic acid) is reacted with 1.0 mmole of triphenylsilane the resulting catalytic mixture effectively hydrogenated butadiene-1,3 to n-butane.

*Example 22*

(A) Following the procedure described in Example 1 supra, the reaction of 0.10 mmole of chloroplatinic acid with 1.0 mmole of triphenylsilane gave an activated catalytic mixture which effectively catalyzed the hydrogenation of octene-1 to octane. The rate of hydrogen gas absorption during the hydrogenation reaction was 167.0 milliliters per minute. This example is to be compared with Example 21A supra, since a tenfold increase of triphenylsilane prior to reaction with chloroplatinic acid-resulted in a catalytic mixture which increased the hydrogen gas absorption rate during the hydrogenation of octene-1 from 92.0 to 167.0 milliliters per minute.

(B) In an analogous manner as above, when 0.10 mmole of potassium chloropalladate (in lieu of 0.1 mmole of chloroplatinic acid) is reacted with 1.0 mmole of tribenzylsilane, the resulting catalytic mixture effectively hydrogenated 2-hydroxyadipaldehyde to 1,2,6-hexanetriol.

*Example 23*

(A) Following the procedure described in Example 1 supra, the reaction of 0.1 mmole of chloroplatinic acid with 0.1 mmole of tribenzylsilane gave an activated catalytic mixture which effectively catalyzed the hydrogenation of octene-1 to octane. The rate of hydrogen gas absorption during the hydrogenation reaction was 135.7 milliliters per minute.

(B) In an analogous manner as above, when 0.05 mmole of potassium chloropalladate (in lieu of 0.1 mmole of chloroplatinic acid) is reacted with 1.0 mmole of tribenzylsilane, the resulting catalytic mixture effectively hydrogenated methyl sorbate to methyl hexanoate.

*Example 24*

(A) Following the procedure described in Example 1 supra, the reactiton of 0.1 mmole of chloroplatinic acid with 1.0 mmole of tribenzylsilane gave an activated catalytic mixture which effectively catalyzed the hydrogenation of octene-1 to octane. The rate of hydrogen gas absorption during the hydrogenation reaction was 191.0 milliliters per minute. This example is to be compared with Example 23A supra, since a tenfold increase of tribenzylsilane prior to reaction with chloroplatinic acid resulted in a catalytic mixture which increased the hydrogen gas absorption rate during the hydrogenation of octene-1 from 135.7 to 191.0 milliliters per minute.

(B) In an analogous manner as above, when 0.1 mmole of potassium chloroplatinite (in lieu of 0.1 mmole of chloroplatinic acid) is reacted with tri-n-propylsilane, the resulting catalytic mixture effectively hydrogenated 2,4-dinitrophenol to 2,4-diaminophenol.

*Example 25*

Following the procedure described in Example 1 supra, the reaction of 0.1 mmole of chloroplatinic acid with 1.0 mmole of triethylsilane gave an activated catalytic mixture which effectively catalyzed the hydrogenation of octene-1 to octane. The rate of hydrogen gas absorption during the hydrogenation reaction was 149.0 milliliters per minute.

*Example 26*

(A) Following the procedure described in Example 1 supra, the reaction of 0.1 mmole of chloroplatinic acid with 1.0 mmole of tri-n-butylsilane gave an activated catalytic mixture which effectively catalyzed the hydrogenation of octene-1 to octane. The rate of hydrogen gas absorption during the hydrogenation reaction was 133.0 milliliters per minute.

(B) In an analogous manner as above, when 0.1 mmole of sodium chloroplatinite (in lieu of 0.1 mmole of chloroplatinic acid) is reacted with dichlorosilane the resulting catalytic mixture effectively hydrogenated acrylonitrile to propylamine.

*Examples 27–33*

In Examples 27–29 infra, three catalysts were prepared as described by Adams, Vorrhees, and Shriner, Organic Syntheses, 1932, Coll. Vol. 1, page 452. In Examples 30–33 infra, four catalysts were prepared in the manner set forth in Example 1 supra. The above seven catalysts then were employed in the hydrogenation of octene-1 in accordance with the procedure outlined in Example 1. The pertinent data are shown in Table II below.

TABLE II

| Ex. No. | Platinous Oxide, mmole | Hydrochloric Acid, mmole | Silane, mmole | Rate of $H_2$ Absorption, milliliters/minute |
| --- | --- | --- | --- | --- |
| 27 | 0.09 | 0.00 | None | 64.4 |
| 28 | 0.09 | 0.03 | do | 66.5 |
| 29 | 0.09 | 0.10 | do | 67.1 |
| 30 | 0.09 | 0.03 | 0.10 tribenzylsilane | 92.8 |
| 31 | 0.09 | 0.03 | 1.0 tribenzylsilane | 101.0 |
| 32 | 0.09 | 0.10 | 1.0 tribenzylsilane | 116.5 |
|  |  | 0.00 | 0.15 trichlorosilane | 96 |

*Example 34*

Following the procedure described in Example 1 supra, an activated catalytic mixture was prepared using 0.2 mmole of chloroplatinic acid and 1.0 mmole of tribenzylsilane in 50 milliliters of 95 percent ethanl. The resulting catalytic mixture then was stored in a normal glass-stoppered bottle, at room temperature, and after varying periods of time a 5 milliliter portion of this catalytic mixture was used to catalyze the hydrogenation of octene-1 to octane in the manner explained in Example 1. The pertinent data are set forth in Table III below.

TABLE III

| Catalytic Mixture, milliliters | Time After Preparation, hrs. | Rate of $H_2$ Absorption, milliliters/minute |
| --- | --- | --- |
| 5.0 | 1 | 120 |
| 5.0 | 18 | 104 |
| 5.0 | 92 | 102 |

The above example reveals that the novel activated catalytic mixture possesses a useful shelf life.

*Example 35*

A conventional hydrogenation apparatus comprising a 500 ml. pressure bottle equipped with mechanical shaker, pressure gauge, and connected by means of rubber pressure tubing to a hydrogen tank (through a needle valve) was used to carry out the hydrogenation of octene-1. In the pressure bottle there were placed 100 ml. of 95% ethyl alcohol containing 0.02 mmole of chloroplatinic acid and 0.6 mmole of triethoxysilane. The mixture was allowed to stand until reduction of the chloroplatinic acid took place as indicated by darkening of the alcohol solution. At this point there was added 0.1 mol of octene-1 and the system was purged with hydrogen. Introduction of hydrogen into the pressure bottle containing the hydrogenation mixture at 2–3 atmospheres pressure with mechanical shaking resulted in a rapid uptake of hydrogen until approximately 0.1 mol of the hydrogen gas had been absorbed. This required less than 10 minutes. Upon fractionation of the resulting reaction product mixture to remove the alcohol, there was obtained 7.8 grams of material boiling in the range of 123°–127° C. and identified as n-octane. Infra-red analysis of this 123°–127° C. fraction showed it to be free of olefinic unsaturation.

*Example 36*

Using the hydrogenation apparatus described in Example 35, an active hydrogenation catalyst was prepared by warming a solution of 0.02 mmole of potassium chloroplatinate dissolved in 100 ml. of 95% ethyl alcohol with 0.13 mmole of tetramethyldisiloxane and used to reduce 0.1 mol of isoprene to the corresponding saturated hydrocarbon. Reduction was substantially complete in less than 10 minutes under a hydrogen pressure of 2–3 atmospheres at room temperature as evidenced by the absorption of approximately 0.2 mol of hydrogen by the alcohol solution.

*Example 37*

In the manner described in Example 35, an active hydrogenation catalyst was prepared from 0.02 mmole of chloroplatinic acid dissolved in 100 cc. of ethyl alcohol and 0.15 mmole of trimethoxysilane. The catalyst solution was used to reduce 0.1 mol of 4-chlorobutene-1 with 2–3 atmospheres of hydrogen at room temperature. The saturated compound, n-butyl chloride, was recovered from the hydrogenation mixture.

*Example 38*

In a 300 cc. stainless steel pressure reactor, there were placed 0.2 mmole of chloroplatinic acid dissolved in 100 ml. of ethyl alcohol, 0.6 mmole of triethoxysilane and 0.1 mol of cyclohexene. The reactor was sparged free of air with hydrogen and then pressurized with 500 lbs./sq. in. of hydrogen. When the vessel was mechanically agitated at room temperature in a rocking device, a rapid uptake of hydrogen occurred corresponding closely to the theoretical amount required for reduction of cyclohexene to cyclohexane.

*Example 39*

The following example illustrates the utility of Si—H compounds in preparing highly active supported platinum catalysts.

In a 250 ml. flask, there was suspended in a solution of 0.02 mmole of chloroplatinic acid dissolved in 50 ml. of ethyl alcohol 0.2 gram of finely divided gamma-alumina. To this, there was added 0.5 mmole of triethoxysilane and the resulting mixture heated, with shaking, at the boling point for several minutes. After allowing the mixture to cool to room temperature the suspended grey solids were filtered from the alcohol solution and used directly in the hydrogenation of 0.1 mol ethyl maleate. Substantially complete reduction of ethyl maleate to ethyl succinate was obtained using the conditions for hydrogenation described in Example 35 supra.

*Example 40*

In a solution of 0.2 mmole of chloroplatinic acid dissolved in 50 ml. of ethyl alcohol, there was suspended 0.1 gram of finely divided activated charcoal. After addition of 0.6 mmole of triethoxysilane and heating for ten minutes, with stirring, to obtain reduction of the chloroplatinic acid, the suspended black solids were filtered from the alcohol solution. The damp solids which now contain the platinum catalyst in a highly active form then were used to carry out a reduction of 0.1 mol allyl ethyl ether with hydrogen under the conditions described in Example 35 supra. Substantially complete reduction to the saturated compounds, i.e. propyl ethyl ether, was obtained.

*Example 41*

To a solution of 0.02 mmole of chloroplatinic acid dissolved in 0.1 mol of crotyl alcohol, there was added 0.6 mmole of triethoxysilane and the resulting mixture heated to obtain reduction of chloroplatinic acid by the Si—H bonded compound. At this point, 100 ml. of n-hexane was added and the mixture placed in the hydrogenation apparatus described in Example 35. After shaking the mixture with 2–3 atmospheres of hydrogen, at room temperature, for 30 minutes approximately the theoretical amount of hydrogen was absorbed by the system. Upon fractionation, n-butyl alcohol was isolated from the hydrogenation mixture.

What is claimed is:

1. A process for producing an activated hydrogenation catalyst which comprises reducing, in the absence of unsaturated compounds, a metal compound, the metal component of which is in one of its oxidation states, said reduction being limited solely to those metals of the group consisting of ruthenium, rhodium, palladium, osmium, iridium, and platinum; with an Si—H bonded compound which contains at least one hydrogen atom bonded to a silicon atom; in a ratio of equivalents of silanic hydrogen atoms from said Si—H bonded compound per mol of said metal compound of at least about 1:20; for a period of time sufficient to reduce at least a portion of the metal component of said metal compound from its original oxidation state to a lower oxidation state.

2. A process for producing an activated hydrogenation catalyst which comprises reducing a metal compound, the metal component of which is in one of its oxidation states, said reduction being limited solely to those metals of the group consisting of ruthenium, rhodium, palladium, osmium, iridium, and platinum; with an Si—H bonded compound which contains at least one hydrogen atom bonded to a silicon atom; in a ratio of equivalents of silanic hydrogen atoms from said Si—H bonded compound per mol of said metal compound of at least about 1:10; in the presence of an inert, normally-liquid organic vehicle and in the absence of unsaturated compounds; for a period of time sufficient to reduce a portion of the metal component of said metal compound from its original oxidation state to a lower oxidation state.

3. The process of claim 2 wherein the reaction is effected for a period of time sufficient to reduce at least a portion of the metal component of said metal compound from its original oxidation state to its zero oxidation state.

4. The process of claim 3 wherein said metal compound is chloroplatinic acid.

5. The process of claim 3 wherein said metal compound is alkali metal haloplatinate.

6. The process of claim 3 wherein said metal compound is a palladium compound which is capable of forming a palladium-olefin complex.

7. A process for producing an activated hydrogenation catalyst which comprises reducing a metal compound, the metal component of which is in one of its oxidation states, said reduction being limited solely to those metals of the group consisting of ruthenium, rhodium, palladium, osmium, iridium, and platinum; with an Si—H bonded compound which contains at least one hydrogen atom bonded to a silicon atom; in a ratio of equivalents of silanic hydrogen atoms from said Si—H bonded compound per mol of said metal compound which is in excess of that required to reduce the metal component of said metal compound from its original oxidation state to its zero oxidation state; in the presence of an inert, normally-liquid organic vehicle and in the absence of unsaturated compounds; and for a period of time sufficient to reduce at least a portion of the metal component from its original oxidation state to its zero oxidation state.

8. A process or producing an activated hydrogenation catalyst which comprises reducing, in the presence of an inert, normally-liquid organic vehicle and in the absence of unsaturated compounds, a metal compound, the metal component of which is in one of its oxidation states, said reduction being limited solely to those metals of the group consisting of ruthenium, rhodium, palladium, osmium, iridium, and platinum; with an Si—H bonded compound which contains at least one hydrogen atom bonded to a silicon atom; in a ratio of equivalents of silanic hydrogen atoms from said Si—H bonded compound per mol of said metal compound which is in excess of that required to reduce the metal component of said metal compound from its original oxidation state to its zero oxidation state; at a temperature in the range of from about 20° C. to below that temperature at which decomposition of the reactants occurs; and for a period of time sufficient to reduce at least a portion of the metal component from its original oxidation state to its zero oxidation state.

9. The process of claim 8 wherein said metal compound is chloroplatinic acid.

10. The process of claim 9 wherein said Si—H bonded compound is a monomeric silane.

11. The process of claim 10 wherein said chloroplatinic acid and said monomeric silane are dissolved in the inert, normally-liquid organic vehicle.

References Cited

UNITED STATES PATENTS

| 2,917,466 | 12/1959 | Tamele et al. | 252—460 |
| 3,048,574 | 8/1962 | Wiberg et al. | 252—429 |
| 3,198,766 | 8/1965 | Nitzsche et al. | 252—430 |

OTHER REFERENCES

Rideal et al.: Catalysis in Theory and Practice; London, MacMillan and Company, 1926; pgs. 239–240, 243–244.

DANIEL E. WYMAN, *Primary Examiner*.

TOBIAS E. LEVOW, J. G. LEVITT, L. G. XIARHOS,
*Assistant Examiners.*